United States Patent [19]

Abdulally

[11] Patent Number: 5,218,932
[45] Date of Patent: Jun. 15, 1993

[54] FLUIDIZED BED REACTOR UTILIZING A BAFFLE SYSTEM AND METHOD OF OPERATING SAME

[75] Inventor: Iqbal F. Abdulally, Randolph, N.J.

[73] Assignee: Foster Wheeler Energy Corporation, Clinton, N.J.

[21] Appl. No.: 962,995

[22] Filed: Oct. 16, 1992

Related U.S. Application Data

[63] Continuation of Ser. No. 844,074, Mar. 2, 1992, abandoned.

[51] Int. Cl.$^5$ .............................. B09B 3/00; F22B 1/00
[52] U.S. Cl. ................................... 122/4 D; 110/245; 165/104.16; 422/145
[58] Field of Search ............... 122/4 D; 110/245, 263, 110/347; 165/104.16; 422/144, 145, 146

[56] References Cited

U.S. PATENT DOCUMENTS

| | | | |
|---|---|---|---|
| 4,052,140 | 10/1977 | Highley | 110/245 X |
| 4,359,968 | 11/1982 | Stewart . | |
| 4,517,162 | 5/1985 | Moss | 422/145 X |
| 4,686,939 | 8/1987 | Stromberg . | |
| 4,688,521 | 8/1987 | Korenberg | 122/4 D |
| 4,828,486 | 5/1989 | Sakamoto et al. | 122/4 D X |
| 4,829,912 | 5/1989 | Alliston et al. | 122/4 D X |
| 4,947,804 | 8/1990 | Abdulally . | |

FOREIGN PATENT DOCUMENTS

| | | |
|---|---|---|
| 598228 | 2/1941 | United Kingdom . |
| 1567909 | 5/1980 | United Kingdom . |

OTHER PUBLICATIONS

J. Makansi and R. Schwieger, Fluidized-bed Boilers, Special Report, Power, May 1987, pp. S-1 through S-16.

J. Makansi, Fluidized-bed Boilers, Special Report, Power, Mar. 1991, pp. 15-32.

*Primary Examiner*—Edward G. Favors
*Attorney, Agent, or Firm*—Marvin A. Naigur

[57] ABSTRACT

A fluidized bed reactor and method of operating same in which a bed of particulate material including fuel is formed in a furnace section. A stripper/cooler is located adjacent the furnace section for receiving particulate material from the furnace section. The particulate material is passed first to the stripper section where air is passed through the particulate material at a velocity sufficient to entrain relatively fine portions of the particulate material. A plurality of spaced baffle members are disposed in the stripper section for impacting with the entrained particulate material to separate it from the air. The particulate material in the stripper section is passed to the cooler section in which air is passed through the particulate material at a velocity sufficient to cool the particulate material and entrain relatively fine portions of the particulate material. A second plurality of spaced baffle members are disposed in the cooler section for impacting with the entrained particulate material to separate it from the air. A drain pipe registers with the cooler section for removing the particulate material from the reactor.

48 Claims, 2 Drawing Sheets

FLUIDIZED BED REACTOR UTILIZING A BAFFLE SYSTEM AND METHOD OF OPERATING SAME

This is a continuation of copending application Ser. No. 07/844,074 filed on Mar. 2, 1992 abandoned.

BACKGROUND OF THE INVENTION

This invention relates to a fluidized bed reactor and method for operating same and, more particularly, to a fluidized bed reactor utilizing a baffle system for an improved particulate material recirculation rate.

Reactors, such as combustors, steam generators and the like, utilizing fluidized beds as the primary source of heat generation, are well known. In these arrangements, air is passed into the furnace section of the reactor and through a bed of particulate material contained therein which includes a mixture of a fossil fuel, such as coal, and an adsorbent, such as limestone, to adsorb the sulfur generated as a result of combustion of the coal. The air fluidizes the bed and promotes the combustion of the fuel. When the reactor is utilized as a steam generator the heat produced by the combustion of the fuel is utilized to convert water to steam. Fluidized bed reactors provide an attractive combination of high heat release, high sulfur adsorption, low nitrogen oxides emissions and fuel flexibility.

The most typical fluidized bed combustion system is commonly referred to as a "bubbling" fluidized bed in which a dense bed of the particulate material is supported by an air distribution plate, to which the combustion supporting air is introduced through a plurality of perforations in the plate, causing the particulate material to expand and take on a suspended, or fluidized, state. The air velocity is typically two to three times that needed to develop a pressure drop which will support the bed weight (e.g., minimum fluidization velocity), causing the formation of bubbles that rise up through the bed and give the appearance of a boiling liquid.

In an effort to extend the improvements in combustion efficiency, pollutant emissions control, and operation turn-down afforded by the bubbling bed, a fluidized bed reactor was developed utilizing an expanded and elutriating fluidized bed commonly referred to as a "circulating" fluidized bed. In these arrangements, the size of the particulate material is decreased and/or the mean air velocity is increased when compared to the bubbling bed, so that the bed surface becomes more diffused and the entrainment of solids from the bed is increased. According to this process, in the lower portion of the furnace section, fluidized bed densities are attained which are well below those typical of bubbling fluidized beds, whereas the upper portion of the furnace section becomes loaded with entrained particulate material, or solids, to a much greater extent than in bubbling fluidized beds. This increased solids entrainment in the upper portion of the furnace section results in a high solids throughput which requires a high solids recycle rate. Reactors having high solids recycle rates require large and expensive separators to separate the entrained solids from the hot combustion gases before the gases pass through a heat recovery area to reduce erosion of the heat recovery surfaces in the heat recovery area. The separated solids are passed back to the fluidized bed.

U.S. Pat. Nos. 4,809,623 and 4,809,625, assigned to the same assignee as the present application, disclose a fluidized bed reactor in which a dense, or bubbling, fluidized bed is maintained in the lower portion of the furnace section, while the bed is otherwise operated as a circulating fluidized bed. The design is such that advantages of both a bubbling bed and a circulating bed are obtained, not the least significant advantage being the ability to utilize particulate fuel material extending over a greater range of particle sizes.

In all of these designs, a homogenous mixture of fuel and adsorbent particulate material, is formed, with a portion of the fuel particles being unburned, a portion being partially burned and a portion being completely burned; and a portion of the adsorbent being unreacted, a portion being partially reacted and a portion being completely reacted. The particulate material must be discharged from the system efficiently to accommodate the introduction of fresh fuel and adsorbent. To this end, a portion of the particulate material is usually passed from the lower portion of the bed through a drain pipe to remove that portion from the reactor.

It has been found, however, that the particle size distribution in a fluidized bed, an important operating parameter, can be effectively controlled by recirculating part of this removed particulate material back to the furnace section. This is often accomplished by blowing air through the removed particulate material to strip away and entrain the finer portions of the particulate material and returning them to the furnace section.

For example, in U.S. Pat. No. 4,829,912, a patent assigned to the same assignee as the present application, a method of controlling the particle size distribution in a fluidized bed reactor is disclosed in which air entrains the finer portions of the particulate material removed through the drain pipe by stripping them with a stream of air and recirculating them back to the furnace section. In these types of arrangements, the heat of the nonrecirculated particulate material can be put to productive use, such as to preheat combustion supporting ga or for reheat or superheat duty.

A stripper/cooler located adjacent the furnace section of the reactor can accomplish both the recirculation of the finer portions of the removed particulate material an the removal of heat from the removed but nonrecirculated particulate material. In these types of arrangements, the stripper/cooler receives the particulate material from the furnace section through a drain pipe and air is blown through a first section of the stripper/cooler to strip, or entrain, some of the fine portions of the particulate material which are returned to the furnace section. The remaining particulate material in the stripper/cooler is then usually passed to a cooler section where heat is removed from the particulate material by passing water/steam in a heat exchange relation to the particulate material or by blowing air through it before it is discharged from the system. When air is used to remove the heat from the nonrecirculated particulate material, this air is often returned to the furnace section as preheated combustion supporting air.

However, in some situations, such as when fuels that generate an excessive amount of relatively fine ash are used, or when a relatively large amount of relatively fine adsorbent has to be used with fuels having a relatively high sulfur content, the relatively fine particle material stripped in the stripper/cooler and returned to the furnace section increases the volume of the fines in the furnace section, or the upper furnace loading, to unacceptably high levels. Excessive upper furnace loading requires larger and more expensive stripper/coolers and separators and/or requires that the furnace be operated at a low stoichiometric condition, which is inefficient.

This upper furnace loading is made worse when the method used to cool the particulate material in the cooler section of the stripper/cooler is by blowing air through it. To achieve a high cooling rate, the air velocity and flow rate through the cooler section must be relatively high. A high air velocity and flow rate, however, entrains greater amounts of particulate material resulting in an even greater volume of fines returned to the furnace section when this air is used as combustion supporting air, thereby further increasing the upper furnace loading. To complicate the matter, a high air velocity in the cooler section is also necessary to prevent agglomeration of the particulate material in the stripper/cooler.

SUMMARY OF THE INVENTION

It is therefore an object of the present invention to provide a fluidized bed reactor in which particulate material is removed from the furnace section of the reactor and passed to a stripper/cooler.

It is a further object of the present invention to provide a fluidized bed reactor of the above type in which a relatively small stripper/cooler can handle increased recirculation of particulate material between the furnace section and the stripper/cooler.

It is a further object of the present invention to provide a fluidized bed reactor of the above type in which particulate material is removed from the reactor through the cooler section of the stripper/cooler.

It is a further object of the present invention to provide a fluidized bed reactor of the above type in which loading in the upper furnace section of the reactor is not increased.

It is a further object of the present invention to provide a fluidized bed reactor of the above type in which the particulate material recycle rate through the flue gas separator is reduced by removing relatively fine particulate material through the stripper/cooler.

It is a further object of the present invention to provide a fluidized bed reactor of the above type in which the stoichiometry of the furnace section can be controlled independently from the recirculation rate of particulate material between the furnace section and the stripper/cooler.

It is a still further object of the present invention to provide a stripper/cooler for receiving particulate material from a fluidized bed reactor.

It is a still further object of the present invention to provide a stripper/cooler of the above type having a stripper section in which relatively fine particles are separated from the particulate material and a cooler section in which heat is removed from the particulate material.

It is a still further object of the present invention to provide a stripper/cooler of the above type which does not increase the recirculation rate of particulate material between the furnace section of a fluidized bed reactor and the stripper/cooler and does not increase the loading of entrained particulate material in the upper furnace section.

It is a still further object of the present invention to provide a stripper/cooler of the above type having an increased velocity and flow rate of stripping and cooling air to prevent agglomeration of the particulate material in the stripper/cooler and to increase the cooling efficiency of the cooler section of the stripper/cooler.

It is a still further object of the present invention to provide a stripper/cooler in which baffles are used to prevent excess stripped, relatively fine particulate material from being passed from the stripper/cooler to the furnace section of a fluidized bed reactor.

Toward the fulfillment of these and other objects, the reactor of the present invention features the provision of one or more stripper/coolers located adjacent the furnace section of the reactor for receiving particulate material drained from the fluidized bed of the furnace section. The particulate material is first passed through the stripper section of the stripper/cooler in which a high velocity stream of air is directed through the particulate material to strip away the relatively fine portions of the particulate material, entrain them in the air stream and pass them back to the furnace section through a vent pipe. A plurality of staggered U-beam baffles extend within the stripper section partially blocking the air stream through the vent pipe to separate a portion of the entrained particulate material from the air stream to reduce the amount of particulate material recirculated to the furnace section.

The nonstripped and baffle separated particulate material is the passed to the cooler section of the stripper/cooler in which air is again passed through the particulate material to cool it before it is removed from the reactor through a drain pipe. The air used to cool the particulate material is subsequently directed into the furnace section through a vent pipe to provide preheated secondary combustion air. To remove particulate material stripped by this cooler section air and entrained therein, a second set of staggered U-beam baffles extend within the cooler section vent pipe to separate a portion of the entrained particulate material from the cooler section air to reduce the amount of particulate material recirculated to the furnace section.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings in which.

DESCRIPTION OF THE PREFERRED EMBODIMENT

Figure 1:
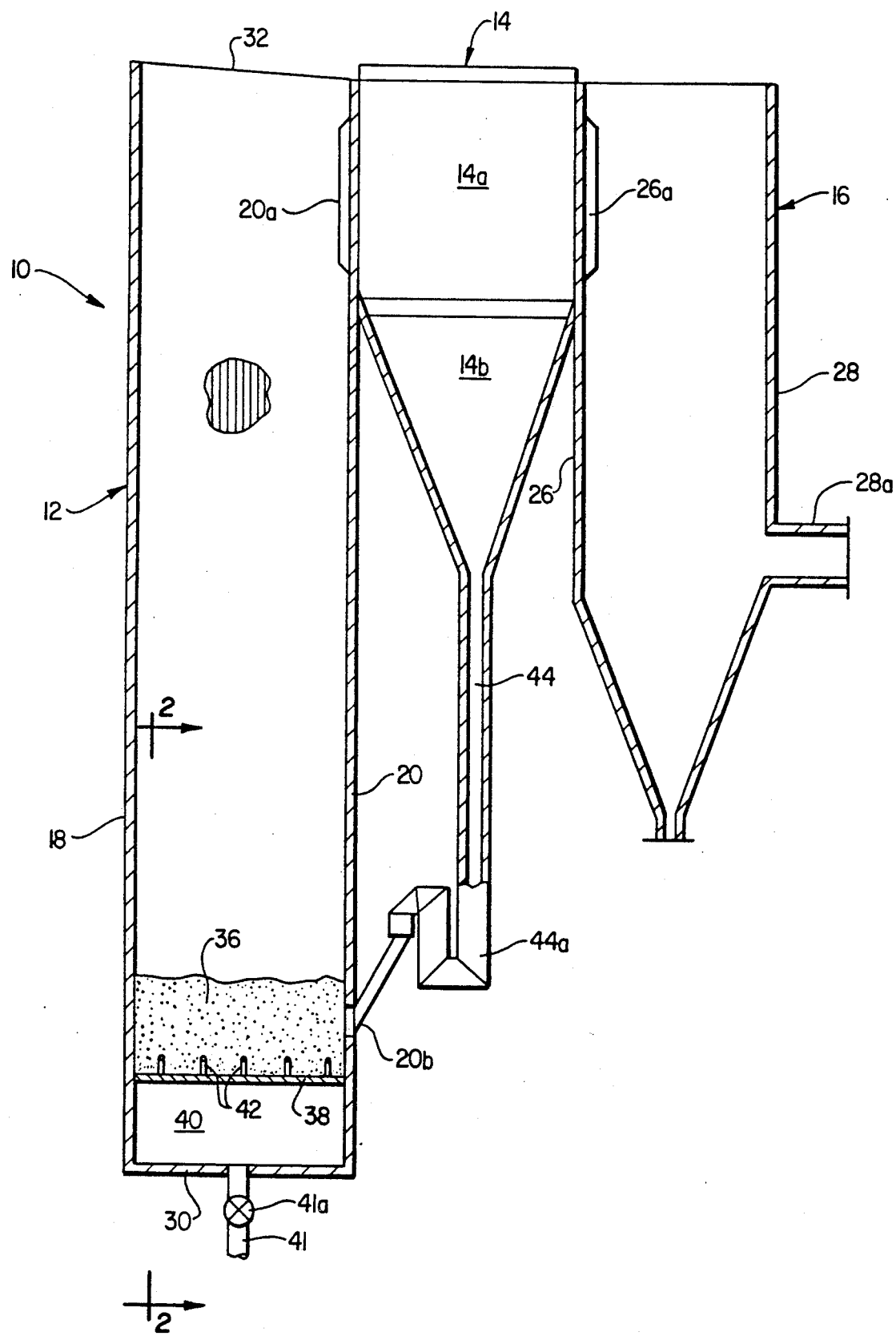
FIG. 1 is a sectional view of the fluidized bed reactor and stripper/cooler of the present invention.

FIG. 1 depicts the fluidized bed reactor of the present invention which is shown in general by the reference numeral 10. The reactor 10 includes a furnace section 12, a separating section 14 and a heat recovery section 16, all shown in sectional with their internal components removed for the convenience of presentation.

Figure 2:
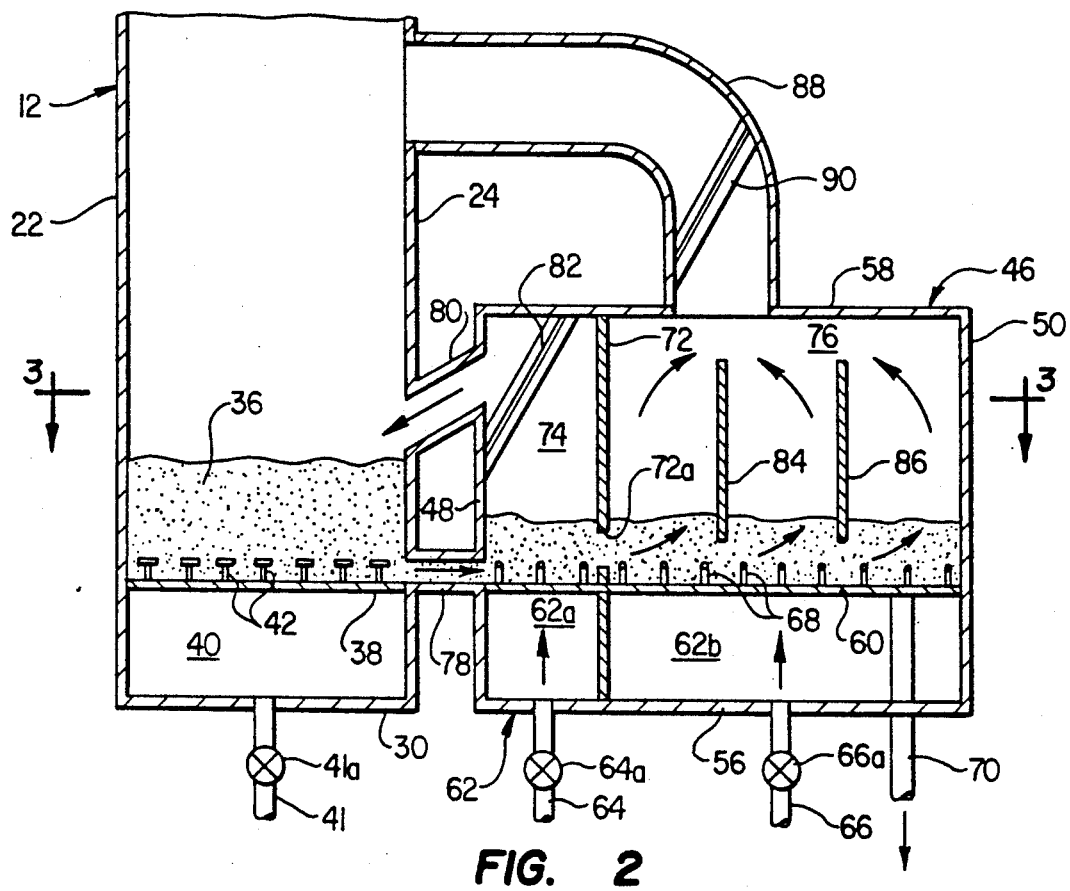
FIG. 2 is a cross-sectional view taken along the line 2—2 of FIG. 1.

Referring to FIGS. 1 and 2, the furnace section 12 is defined by a front wall 18, a rear wall 20 and two sidewalls 22 and 24. Two walls 26 and 28 are provided in a spaced parallel relation to the wall 20 with the separating section 14 being defined by the walls 20 and 26, and the heat recovery section 16 being defined by the walls 26 and 28. A floor 30 is provided in the furnace section 12 and a roof 32 extends over the furnace section 12, the separating section 14 and the heat recovery section 16. Although not shown in the drawings, it is understood that the separating section 14 and the heat recovery section 16 are provided with sidewalls, which can be extensions of the sidewalls 22 and 24.

Openings 20a and 26a are provided in the upper portions of the walls 20 and 26, respectively, for permitting combustion flue gases produced in the furnace section 12 to pass from the furnace section into the separating section 14 and from the separating section to the heat recovery section 16, as will be explained.

It is understood that if the reactor 10 is used for the purpose of steam generation, the walls 18, 20, 22, 24, 26 and 28 would be formed by a plurality of heat exchange tubes formed in a parallel, gas tight manner to carry the fluid to be heated, such as water, such tubes shown schematically in FIG. 1 and referred to by reference numeral 34. It is also understood that a plurality of headers (not shown) would be disposed at both ends of each of the walls 18, 20, 22, 24, 26 and 28 which, along with additional tubes and associated flow circuitry, would function to route the water through the interior of the reactor and to and from a steam drum (not shown) in a conventional manner. These components are omitted in the drawings for the convenience of presentation.

A bed of particulate material, shown in general by the reference numeral 36, is disposed within the furnace section 12 and rests on a perforated plate 38 extending horizontally in the lower portion of the furnace section. The bed 36 can consist of discrete particles of fuel material, such as bituminous coal, which are introduced into the furnace section 12 by a feeder or the like in any known manner. It is understood that a sulfur adsorbing material, such as limestone, can also be introduced into the furnace section 12 in a similar manner which material adsorbs the sulfur generated by the burning coal.

It is also understood that a bed light-off burner (not shown) is mounted through the wall 18 immediately above the plate 38 for initially lighting off a portion of the bed 36 during start-up.

A plenum 40 is defined between the plate 38 and the floor 30 and receives pressurized air from an external source via air conduit 41 under control of a damper 41a. A plurality of nozzles 42 extend through perforations provided in the plate 38 and ar adopted to discharge air from the plenum 40 into the bed 36 supported on the plate 38. The air passing through the bed 36 fluidizes the bed to promote combustion of the fuel and combines with the products of combustion forming combustion flue gases which rise by convection in the furnace section 12. The flue gases entrain a portion of the relatively fine particulate material in the furnace section 12 before passing, via the opening 20a, into the separating section 14.

The separating section 14 includes a cyclone separator 14a which functions in a conventional manner to separate the entrained particulate material from the flue gases. The separated flue gases pass through the opening 26a in the wall 26 to the heat recovery section 16 and the separated particulate material, or separated solids, pass into a hopper portion 14b of the separating section 14. It is understood that one or more heat exchange units, such as a superheater, reheater or the like can be provided in the heat recovery section 16 for removing the heat from the separated flue gases as they pass downwardly in the section 16 before exiting through an outlet 28a extending through the wall 28.

A dipleg 44 extends from the hopper portion 14b of the separating section 14 to an opening 20b in the wall 20 of the furnace section 12 to pass the separated solids back to the bed 36. The dipleg 44 has a U-shaped portion forming a J-valve 44a for preventing the backflow of particulate material and/or gases directly from the furnace section 12 to the separating section 14, it being understood that the J-valve 44a could be replaced by an L-valve, seal pot, integral recycle heat exchanger or other device which could prevent the aforementioned backflow.

Figure 3:
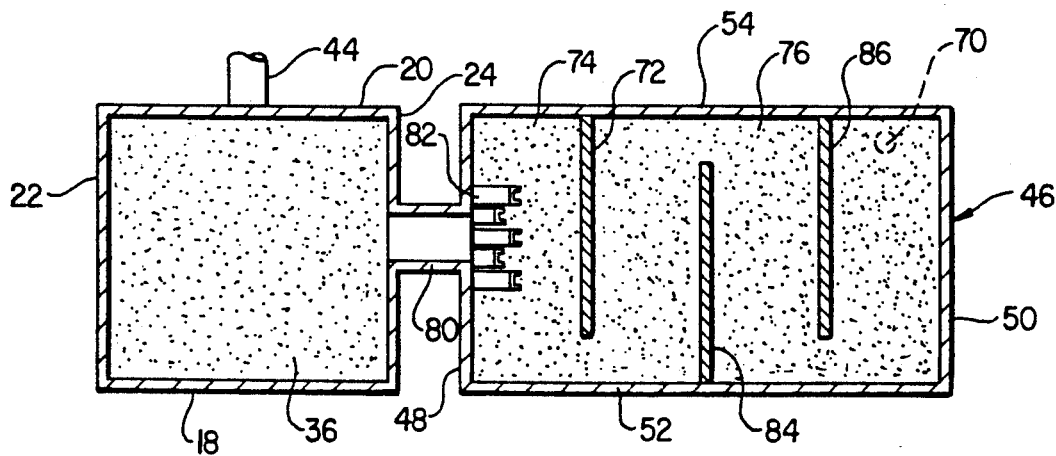
FIG. 3 is a cross-sectional view taken along the line 3—3 of FIG. 2.

Referring to FIGS. 2 and 3 at least one stripper/cooler 46 is disposed adjacent the sidewall 24 of the furnace section 12. The stripper/cooler 46 is generally rectangular in shape and is defined by a front wall 48, a rear wall 50, two sidewalls 52 and 54, a floor 56 and a roof 58. It is again understood that if the reactor 10 is used for the purpose of steam generation, the walls 48, 50, 52 and 54 would be formed by a plurality of heat exchange tubes in association with a plurality of headers and flow circuitry as previously described.

A perforated plate 60 is disposed in the lower portion of the stripper/cooler 46 and extends horizontally in the same plane as the plate 38 spaced from the floor 56 to form a plenum 62 therebetween. Two conduits 64 and 66 receive gas, such as air, from an external source and communicate with the plenum 62 at spaced locations to independently control the pressure in various portions of the plenum 62 as will be described. Control dampers 64a and 66a are disposed in the conduits 64 and 66, respectively, to provide such independent control.

The plate 60 is perforated and receives a plurality of nozzles 68 which are directed to discharge air from the plenum 62 toward a drain pipe 70 extending through an enlarged opening in the plate 60. The drain pipe 70 extends through the floor of the stripper/cooler 46 and projects downwardly. A valve (not shown) is provided in the drain pipe 70 to control the flow of particles through the pipe.

A vertical partition 72 extends downwardly from the roof 58 to divide the plenum 62 into two sections 62a and 62b and to divide the stripper/cooler 46 into a stripper section 74 defined above the plenum section 62a between the partition 72 and the wall 48 and a cooler section 76 defined above the plenum section 62b between the partition 72 and the wall 50. An opening 72a is formed in the lower portion of the partition 72 above the plate 60 to allow particulate material in the stripper section 74 to pass to the cooler section 76.

A relatively large horizontal duct 78 connects an opening formed in the sidewall 24 of the furnace section 12 to a corresponding opening formed in the adjacent wall 48 of the stripper/cooler 46 to permit the particulate material in the bed 36 of the furnace section 12 to pass into the stripper section 74 of the stripper/cooler 46. Similarly, a vent pipe 80 is located above the duct 78 and connects corresponding openings in the sidewall 24 of the furnace section 12 and the adjacent wall 48 of the stripper/cooler 46 to direct air from the plenum section 62a to the furnace section 12 after passing through the particulate material in the stripper section 74.

A plurality of staggered U-beam baffles 82 extend from the wall 48 to the roof 58 within the stripper section 74 at an angle to the vertical to partially block the flow of air through the vent 80. As better shown in FIG. 3, the open face of the baffles 82 face away from the vent 80 to separate entrained particulate material from the air flowing toward the vent 80 as will be explained.

Partial vertical partitions 84 and 86 are suspended in the cooler section 76 and extend partway from the sidewalls 52 and 54, respectively, to divide the cooler section 7 into three compartments for purposes that will be described. A vent pipe 88 connects an opening formed in the roof 58 of the cooler section 76 of the stripper/cooler 46 to a corresponding opening formed in the sidewall 24 of the furnace section 12 to direct air from the plenum section 62b to the furnace section 12 after passing through the particulate material in the cooler section 74.

A plurality of staggered U-beam baffles 90, similar to the baffles 82, extend within the vent 88 to partially block the flow of air through the vent 88. The open face of the baffles 90 face toward the cooler section 76 to separate entrained particulate material from the air flowing through the vent 88 as will be explained.

In operation, particulate fuel material and adsorbent are introduced into the furnace section 12 and accumulate on the plate 38 (FIG. 1). Air from an external source passes into the plenum 40 via the air conduit 41, through the plate 38, and the nozzles 42 and into the particulate material on the plate to fluidized the bed 36.

The light-off burner (not shown) or the like is fired to ignite the particulate fuel material in the bed 36. When the temperature of the material in the bed 36 reaches a predetermined level, additional particulate material is continuously discharged onto the upper portion of the bed 36. The air promotes the combustion of the fuel and the velocity of the air is controlled by the damper 41a to exceed the minimum fluidizing velocity of the bed 36 to form either a bubbling, circulating or hybrid fluidized bed.

As the fuel burns and the adsorbent particles are reacted, the continual influx of air through the nozzles 42 creates a homogenous fluidized bed of particulate material including unburned fuel, partially-burned fuel, and completely-burned fuel along with unreacted adsorbent, partially-reacted adsorbent and completely-reacted adsorbent.

A mixture of air and the gaseous products of combustion pass upwardly through the bed 36 and entrain, or elutriate, the relatively fine particulate material in the bed. The resulting mixture of flue gases passes upwardly in the furnace section 12 by convection before it exits the furnace section through the opening 20a and passes into the separating section 14. The separator 14a functions in a conventional manner to separate the entrained particulate material from the flue gases. The separated particulate material, or separated solids, fall by gravity into the hopper 14b from which they are injected, via the dipleg 44, back into the bed 36. The relatively clean flue gases pass through the opening 26a, into the heat recovery section 16 and through the latter section before exiting the reactor via the outlet 28a.

The damper 64a (FIG. 2) is opened as desired to introduce air into the stripper section 74 of the stripper/cooler 46, via the plenum section 62a, to promote the flow of particulate material from the bed 36 in the furnace section 12 to the stripper section 74 via the duct 78. Additional air, under the control of the damper 41a, is introduced into the plenum section 62a which passes upwardly through the plate 60 and fluidizes particulate material flowing into the stripper section 74. The velocity of the air introduced into the stripper section 74 is carefully controlled by the damper 64a to control the degree of flow of material into the stripper section 74, the degree of fluidization of the particulate material, the resultant height of the particulate material and the amount of the relatively fine particulate material which is stripped away from the particulate material and entrained by the air as it passes upwardly through the stripper section 74.

As the air and entrained relatively fine particulate material moves toward the vent 80 for recirculation into the furnace section 12, the mixture must pass in a tortuous path due to the staggered arrangement of the plurality of U-beam baffles 82. The staggered arrangement of the baffles 82 force the air to serpentine around the baffles 82. The entrained fine particulate material however will tend to travel linearly and be separated from the air as it engages the open face of the baffles, falling by gravity back into the bed of particulate material in the stripper section 74.

The damper 66a is opened as desired to introduce air into the plenum section 62b which passes upwardly through the plate 60 and the nozzles 68, fluidizes the particulate material in the cooler section 76, and promotes the flow of the nonstripped and baffle-separated particulate material from the stripper section 74 to the cooler section 76. The nozzles 68 are directed to discharge the air toward the drain pipe 70 and around the partitions 84 and 86 which function to increase the residence time of the particulate material in the cooler section 76 before draining. The velocity of the air and therefore the degree of flow of the material into the cooler section 76 and the degree of fluidization and the resultant height of the material in the cooler section 76 are respectively controlled as needed by varying the position of the damper 66a.

The air discharged into the cooler section 76 removes heat from the particulate material contained therein and flows toward the vent 88 for use as secondary combustion air in the furnace section 12, it being understood that this heated air from the cooler section 76 could be used in other ways.

The U-beam baffles 90 contained in the vent 88 act in the same manner as the U-beam baffles 82 to separate any entrained particulate material in the air. The air passes to the furnace section 12 and the separated particulate material falls back into the cooler section 76. The particulate material in the cooler section 76 is removed from the reactor 10 by means of the drain pipe 70.

It is thus seen that the device of the present invention provides several advantages. For example, recirculation of the particulate material in a fluidized bed furnace can be accomplished with a relatively small stripper/cooler since the recirculation rate is decreased by removing some of the particulate material and preventing it from recirculating back into the furnace section. In addition, by reducing the amount of particulate material recirculated back into the furnace section from the stripper/cooler, the loading in the upper furnace section of the reactor is not increased, thereby improving the stoichiometric conditions of the reactor as well as reducing the size and expense of the separator section needed to separate the entrained particulate material from the combustion flue gases.

Further, by being able to control the amount of entrained particulate material from the stripper/cooler that is recirculated into the furnace section, the air flow and velocity into the stripper/cooler can be increased to prevent agglomeration of the particulate material in the stripper/cooler as well as to increase the cooling efficiency of the cooler section of the stripper/cooler.

It is understood that variations may be made in the foregoing without departing from the scope of the invention. For example, the horizontal duct 78 can be replaced by a generally vertical duct extending downwardly from the bed 36 and the stripper/cooler disposed beneath the furnace section 12.

Other changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed reactor, comprising:
   a furnace section;
   means for forming a bed of particulate material in said furnace section;
   a vessel disposed adjacent said furnace section;
   means for partitioning said vessel into first and second sections;
   first passage means connecting said furnace section to said first section for permitting said particulate material to pass from said furnace section to said first section;
   means for passing gas through said particulate material in said first section to entrain relatively fine portions of said particulate material;
   means disposed in said first section for separating a portion of said entrained particulate material from said first section gas;
   second passage means connecting said first section to said second section for permitting said particulate material to pass from said first section to said second section;
   means for passing gas through said particulate material in said second section to cool said particulate material and entrain relatively fine portions of said particulate material; and
   means disposed in said second section for separating a portion of said entrained particulate material from said second section gas.

2. The fluidized bed reactor of claim 1 wherein said first passage means comprises a generally horizontal duct connected to openings in the respective walls of said furnace section and said first section.

3. The fluidized bed reactor of claim 1 further comprising means to drain said particulate material from said second section to remove said particulate material from said fluidized bed reactor.

4. The fluidized bed reactor of claim 1 wherein all of said separating means are noncentrifugal.

5. The fluidized bed reactor of claim 1 wherein said entrained particulate material separated from said first section gas falls back into said first section.

6. The fluidized bed reactor of claim 1 wherein said entrained particulate material separated from said second section gas falls back into said second section.

7. The fluidized bed reactor of claim 1 further comprising return means connecting said furnace section to said first section for permitting said separated gas to pass from said first section to said furnace section.

8. The fluidized bed reactor of claim 1 further comprising return means connecting said furnace section to said second section for permitting said separated gas to pass from said second section to said furnace section.

9. The fluidized bed reactor of claim 1 wherein all of said separating means comprise a plurality of staggered U-beam baffles.

10. A fluidized bed reactor comprising:
    a furnace section;
    means for forming a bed of particulate material in said furnace section;
    a stripper disposed adjacent said furnace section;
    passage means connecting said stripper to said furnace section for permitting said particulate material to pass from said furnace section to said stripper;
    means for passing gas through said particulate material in said stripper to entrain relatively fine portions of said particulate material; and
    means for separating said entrained portions of said particulate material from said stripper gas.

11. The fluidized bed reactor of claim 10 further comprising return means connecting said furnace section to said stripper for permitting said stripper gas to pass from said stripper to said furnace section.

12. The fluidized bed reactor of claim 10 wherein said entrained portions of said particulate material separated from said stripper gas fall back into said particulate material in said stripper.

13. The fluidized bed reactor of claim 10 further comprising:
    a cooler disposed adjacent said stripper;
    passage means connecting said cooler to said stripper for permitting said particulate material to pass from said stripper to said cooler;
    means for passing gas through said particulate material in said cooler to cool said particulate material and entrain relatively fine portions of said particulate material; and
    means for separating said entrained portions of said particulate material from said cooler gas.

14. The fluidized bed reactor of claim 13 further comprising return means connecting said furnace section to said cooler for permitting said cooler gas to pass from said cooler to said furnace section.

15. The fluidized bed reactor of claim 13 wherein said entrained portions of said particulate material separated from said cooler gas fall back into said particulate material in said cooler.

16. The fluidized bed reactor of claim 13 wherein all of said separating means are noncentrifugal.

17. The fluidized bed reactor of claim 13 wherein all of said separating means comprise a plurality of staggered U-beam baffles.

18. A fluidized bed reactor, comprising:
    means for forming a furnace section;
    means for forming a primary bed of particulate material in said furnace section;
    means for forming a secondary bed of particulate material proximate to said primary bed;
    means for passing particulate material from said primary bed to said secondary bed;
    means for introducing air to said secondary bed at a velocity sufficient to entrain relatively fine portions of the particulate material; and
    means for separating the entrained particulate material from the air.

19. The fluidized bed reactor of claim 18 further comprising means for passing the air from said secondary bed to said furnace section.

20. The fluidized bed reactor of claim 18 wherein said entrained particulate material separated from the air falls back into said secondary bed.

21. The fluidized bed reactor of claim 18 wherein said separating means comprises a plurality of staggered U-beam baffles disposed for impacting with said entrained particulate material to remove said entrained particulate material from the air.

22. The fluidized bed reactor of claim 18, further comprising:
means for forming a tertiary bed of particulate material proximate to said secondary bed;
means for passing particulate material of said secondary bed to said tertiary bed;
means for introducing air to said second tertiary bed at a velocity and flow rate to fluidize and cool the particulate material in said tertiary bed and entrain relatively fine portions of the particulate material; and
means for separating the entrained particulate material from the tertiary bed air.

23. The fluidized bed reactor of claim 22 further comprising means for passing the tertiary bed air from said tertiary bed to said furnace section.

24. The fluidized bed reactor of claim 22 wherein said entrained particulate material separated from the tertiary bed air falls back into said tertiary bed.

25. The fluidized bed reactor of claim 22 wherein all of said separating means comprise a plurality of staggered U-beam baffles disposed for impacting with said entrained particulate material.

26. A fluidized bed reactor, comprising:
a furnace section;
means for forming a primary bed of particulate material in said furnace section;
a vessel having a first section disposed proximate to said furnace section, said first section having a plate supported therein and adapted to receive said particulate material from said furnace section;
means for passing air through said plate and said particulate material in said first section to entrain relatively fine portions of said particulate material;
means in the upper portion of said first section for permitting said air to exit from said first section; and
baffle means including a plurality of spaced baffle members in said first section disposed between said particulate material and said exit means for impacting with said entrained particulate material in said air to remove said latter material from said air and permit said latter material to fall by gravity back into said particulate material in said first section.

27. The fluidized bed reactor of claim 26 wherein said vessel contains a second section having a plate supported therein and adapted to receive said particulate material from said first section, and said fluidized bed reactor further comprises:
means for passing air through said plate and said particulate material in said second section to cool said particulate material and entrain relatively fine portions of said particulate material;
means in the upper portion of said second section for permitting said air in said second section to exit from said second section; and
baffle means including a plurality of spaced baffle members in said second section disposed between said particulate material and said second section exit means for impacting with said entrained particulate material in said second section air to remove said latter material from said second section air and permit said latter material to fall by gravity back into said particulate material in said second section.

28. The fluidized bed reactor of claim 27 wherein all of said spaced baffle members comprise a plurality of spaced parallel U-beams extending across said first and second sections respectively.

29. A method of operating a fluidized bed reactor, comprising the steps of:
forming a bed of particulate material in a furnace section;
partitioning a vessel into first and second sections;
passing said particulate material from said furnace section to said first section;
passing gas through said particulate material in said first section to entrain relatively fine portions of said particulate material;
separating a portion of said entrained particulate material from said first section gas;
passing said particulate material from said first section to said second section;
passing gas through said particulate material in said second section to cool said particulate material and entrain relatively fine portions of said particulate material; and
separating a portion of said entrained particulate material from said second section gas.

30. The method of claim 29 further comprising the step of draining said particulate material from said second section to remove said particulate material from said fluidized bed reactor.

31. The method of claim 29 wherein all of said separating steps are done noncentrifugally.

32. The method of claim 29 further comprising the step of passing said separated gas in said first section to said furnace section.

33. The method of claim 29 further comprising the step of passing said separated gas in said second section to said furnace section.

34. The method of claim 29 wherein all of said steps of separating said entrained particulate material are done by passing said entrained particulate material through a plurality of staggered U-beam baffles.

35. A method of operating a fluidized bed reactor, comprising the steps of:
forming a primary bed of particulate material in a furnace section;
forming a secondary bed of particulate material proximate to said primary bed;
passing particulate material from said primary bed to said secondary bed;
introducing air to said secondary bed at a velocity sufficient to entrain relatively fine portions of the particulate material; and
separating the entrained particulate material from the air.

36. The method of claim 35 further comprising the step of passing the air from said secondary bed to said furnace section.

37. The method of claim 35 wherein said entrained particulate material separated from the air falls back into said secondary bed.

38. The method of claim 35 wherein said step of separating is done by impacting said entrained particulate material with a plurality of staggered U-beam baffles disposed to remove said entrained particulate material from the air.

39. The method of claim 35, further comprising the steps of:
   forming a tertiary bed of particulate material proximate to said secondary bed;
   passing particulate material of said secondary bed to said tertiary bed;
   introducing air to said second tertiary bed at a velocity and flow rate to fluidize and cool the particulate material in said tertiary bed and entrain relatively fine portions of the particulate material; and
   separating the entrained particulate material from the tertiary bed air.

40. The method of claim 39 further comprising the step of passing the tertiary bed air from said tertiary bed to said furnace section.

41. The method of claim 39 wherein said entrained particulate material separated from the tertiary bed air falls back into said tertiary bed.

42. The method of claim 39 wherein all of said separating steps are done by impacting said entrained particulate material with a plurality of staggered U-beam baffles.

43. A method of operating a fluidized bed reactor, comprising the steps of:
   forming a primary bed of particulate material in a furnace section;
   passing said particulate material from said furnace section to a vessel having a first section disposed proximate to said furnace section, said first section having a plate supported therein and adapted to receive said particulate material;
   passing air through said plate and said particulate material in said first section to entrain relatively fine portions of said particulate material;
   discharging said air from said first section through an opening; and
   impacting said entrained particulate material into a plurality of spaced baffle members in said first section disposed between said particulate material and said opening to remove said latter material from said air and permit said latter material to fall by gravity back into said particulate material in said first section.

44. The method of claim 43 wherein said vessel contains a second section having a plate supported therein and adapted to receive said particulate material from said first section, and said method further comprises the steps of:
   passing air through said plate and said particulate material in said second section to cool said particulate material and entrain relatively fine portions of said particulate material;
   discharging said air in said second section from said second section through an opening in said second section; and
   impacting said entrained particulate material in said second section into a plurality of spaced baffle members in said second section disposed between said particulate material and said second section opening to remove said latter material from said second section air and permit said latter material to fall by gravity back into said particulate material in said second section.

45. The fluidized bed reactor of claim 44 wherein all of said spaced baffle members comprise a plurality of spaced parallel U-beams extending across said first and second sections respectively.

46. A method of operating a fluidized bed reactor, comprising the steps of:
   forming a bed of particulate material in a furnace section;
   passing said particulate material from said furnace section to an adjacent vessel;
   passing gas through said particulate material in said vessel to entrain relatively fine portions of said particulate material; and
   separating said entrained portions of said particulate material from said vessel gas.

47. The method of claim 46 further comprising the step of passing said separated vessel gas from said vessel to said furnace section.

48. The method of claim 46 wherein a bed of said particulate material is found in said vessel, said step of separating is done above said bed, and said separated particulate material falls back to said bed by gravity.

* * * * *